(12) United States Patent
Gorshe

(10) Patent No.: US 7,127,653 B1
(45) Date of Patent: Oct. 24, 2006

(54) APPARATUS AND METHOD FOR EFFICIENT DATA TRANSPORT USING TRANSPARENT FRAMING PROCEDURE

(75) Inventor: Steven Scott Gorshe, Beaverton, OR (US)

(73) Assignee: PMC-Sierra, Inc., Burnaby (CA)

( * ) Notice: Subject to any disclaimer, the term of this patent is extended or adjusted under 35 U.S.C. 154(b) by 348 days.

(21) Appl. No.: 10/190,348

(22) Filed: Jul. 5, 2002

Related U.S. Application Data

(60) Provisional application No. 60/303,331, filed on Jul. 5, 2001.

(51) Int. Cl.
*G06F 11/00* (2006.01)

(52) U.S. Cl. ............... 714/746; 714/735; 714/775

(58) Field of Classification Search ............ 714/8, 714/30, 726, 735, 752, 798, 799, 800, 821, 714/784, 723, 48, 758, 748
See application file for complete search history.

(56) References Cited

U.S. PATENT DOCUMENTS

| | | | | |
|---|---|---|---|---|
| 4,486,739 | A * | 12/1984 | Franaszek et al. | 341/59 |
| 4,567,587 | A * | 1/1986 | McDermott | 370/242 |
| 4,665,517 | A | 5/1987 | Widmer | |
| 5,012,489 | A * | 4/1991 | Burton et al. | 375/222 |
| 5,278,902 | A * | 1/1994 | Nugent | 380/42 |
| 5,467,344 | A * | 11/1995 | Solomon et al. | 370/396 |
| 5,608,738 | A * | 3/1997 | Matsushita | 714/752 |
| 5,699,365 | A * | 12/1997 | Klayman et al. | 714/708 |
| 6,052,390 | A * | 4/2000 | Deliot et al. | 370/528 |

OTHER PUBLICATIONS

Gigabit Ethernet (1998) "Gigabit Ethernet Standard" Located on the World Wide Web at: http://.ece.wpi.edu/courses/ee535/hwk98/hwk3cd98.rogerw.htm pp. 1-7.
Elftmann et al. (1999) "Implementing an 8B/10B Encoder/Decoder for Gigabit Ethernet." International IC Taipei—1999 Conference Proceedings. Located on the World Wide Web at http://www.eetasia.com/ART_8800031665_499481.590626.HTM pp. 1-6.
Optimized Engineering Corporation (2000) "Gigabit Ethernet" Located on the World Wide Web at www.optimixed.com http://www.optimized.com/COMPENDI/L1-GbEn.htm pp. 1-17.
Nortel Networks & Lucent Technologies (2000) "Contribution to T1 Standards Project—Transparent GFP Mappings for Fibre Channel and ESCON." Document No. T1X1.5/2000-197. pp. 1-23.
Nortel Networks (2001) "Contribution to T1 Standards Project—Draft of Transparent Coding for Block-Coded Payloads" Document No. T1X1.5/2000-197R1. pp. 1-31.
Wideband (2000) "Gigabit Networking—The WideBand Standard." Located on the World Wide Web at http://www.wband.com/tech/bicsi1.htm pp. 1-4.

* cited by examiner

*Primary Examiner*—Albert Decady
*Assistant Examiner*—Fritz Alphonse
(74) *Attorney, Agent, or Firm*—Stephen LeBlanc; Quine Intellectual Property Law Group, P.C.

(57) ABSTRACT

A method and/or system and/or apparatus for mapping a protocol including data and a limited number of control codes to an efficient encoding protocol for carrying on various other networks, particularly those with parallel processing. In specific embodiments, the invention decodes 8b/10b type data to 8b data, and then maps the data into transparent GFP frames or blocks and can further map the frames into superblocks of frames and in further embodiments add padding characters on the fly to constructed blocks to reduce buffering needed and to reduce variable delay created during frame construction.

25 Claims, 7 Drawing Sheets

| Input Character | Leading bit | 64-bit field | | | | | | | |
|---|---|---|---|---|---|---|---|---|---|
| All data | 0 | D1 | D2 | D3 | D4 | D5 | D6 | D7 | D8 |
| 7 data, 1 control | 1 | 0aaaC1 | D1 | D2 | D3 | D4 | D5 | D6 | D7 |
| 6 data, 2 control | 1 | 10 aaa bbb C1 C2 | | D1 | D2 | D3 | D4 | D5 | D6 |
| 5 data, 3 control | 1 | 110 aaa bbb ccc C1 C2 | | | D1 | D2 | D3 | D4 | D5 |
| 4 data, 4 control | 1 | 1110 aaa bbb ccc ddd C1 C2 C3 C4 | | | | D1 | D2 | D3 | D4 |
| 3 data, 5 control | 1 | 11110 aaa bbb ccc ddd eee C1 C2 C3 C4 C5 | | | | | D1 | D2 | D3 |
| 2 data, 6 control | 1 | 111110 aaa bbb ccc ddd eee fff C1 C2 C3 C4 C5 C6 | | | | | | D1 | D2 |
| 1 data, 7 control | 1 | 1111110 aaa bbb ccc ddd eee fff ggg C1 C2 C3 C4 C5 C6 C7 | | | | | | | D1 |
| All control | 1 | 11111110 aaa bbb ccc ddd eee fff ggg hhh C1 C2 C3 C4 C5 C6 C7 C8 | | | | | | | |

*FIG. 1 (PRIOR ART)*

| NAME | Octet Value | 10B Code-word (RD-) abcdei fghj | 10B Code-word (RD+) abcdei fghj | 64B/65B 4-bit Mapping |
|---|---|---|---|---|
| /K28.0/ | 1C | 001111 0100 | 110000 1011 | 0000 |
| /K28.1/ | 3C | 001111 1001 | 110000 0110 | 0001 |
| /K28.2/ | 5C | 001111 0101 | 110000 1010 | 0010 |
| /K28.3/ | 7C | 001111 0011 | 110000 1100 | 0011 |
| /K28.4/ | 9C | 001111 0010 | 110000 1101 | 0100 |
| /K28.5/ | BC | 001111 1010 | 110000 0101 | 0101 |
| /K28.6/ | DC | 001111 0110 | 110000 1001 | 0110 |
| /K28.7/ | FC | 001111 1000 | 110000 0111 | 0111 |
| /K23.7/ | F7 | 111010 1000 | 000101 0111 | 1000 |
| /K27.7/ | FB | 110110 1000 | 001001 0111 | 1001 |
| /K29.7/ | FD | 101110 1000 | 010001 0111 | 1010 |
| /K30.7/ | FE | 011110 1000 | 100001 0111 | 1011 |
| 10B_ERR | N/A | Unrecognized RD- | Unrecognized RD+ | 1100 |
| 65B_PAD | N/A | N/A | N/A | 1101 |
| 65B_ESC | N/A | N/A | N/A | 1110 |
| Spare | N/A | N/A | N/A | 1111 |

*FIG. 2 EXAMPLE CONTROL CHARACTER MAPPING*

| Input Character | Lead bit | 64-bit field | | | | | | | |
|---|---|---|---|---|---|---|---|---|---|
| All data | 0 | D1 | D2 | D3 | D4 | D5 | D6 | D7 | D8 |
| 7 data/1 cntl | 1 | 0 aaa C1 | D1 | D2 | D3 | D4 | D5 | D6 | D7 |
| 6 data/2 cntl | 1 | 1 aaa C1 | 0 bbb C2 | D1 | D2 | D3 | D4 | D5 | D6 |
| 5 data/3 cntl | 1 | 1 aaa C1 | 1 bbb C2 | 0 ccc C3 | D1 | D2 | D3 | D4 | D5 |
| 4 data/4 cntl | 1 | 1 aaa C1 | 1 bbb C2 | 1 ccc C3 | 0 ddd C4 | D1 | D2 | D3 | D4 |
| 3 data/5 cntl | 1 | 1 aaa C1 | 1 bbb C2 | 1 ccc C3 | 1 ddd C4 | 0 eee C5 | D1 | D2 | D3 |
| 2 data/6 cntl | 1 | 1 aaa C1 | 1 bbb C2 | 1 ccc C3 | 1 ddd C4 | 1 eee C5 | 0 fff C6 | D1 | D2 |
| 1 data/7 cntl | 1 | 1 aaa C1 | 1 bbb C2 | 1 ccc C3 | 1 ddd C4 | 1 eee C5 | 1 fff C6 | 0 ggg C7 | D1 |
| All control | 1 | 1 aaa C1 | 1 bbb C2 | 1 ccc C3 | 1 ddd C4 | 1 eee C5 | 1 fff C6 | 1 ggg C7 | 0 hhh C8 |

*FIG. 3*

| (BEGIN BLOCK 1 PAYLOAD) | | | Byte 1, 1 | | | | |
|---|---|---|---|---|---|---|---|
| | | | Byte 1, 2 | | | | |
| | | | . | | | | |
| | | | . | | | | |
| | | | . | | | | |
| | | | Byte 8, 7 | | | | |
| (END BLOCK 8 PAYLOAD) | | | Byte 8, 8 | | | | |
| L1 | L2 | L3 | L4 | L5 | L6 | L7 | L8 | where: Byte j, k is the kth byte of the jth 64b/65b code in the superblock
Lj is the leading bit of the jth 64b/65b code in the superblock

*FIG. 4*

| (BEGIN BLOCK 1 PAYLOAD) | | | Byte 1, 1 | | | | |
|---|---|---|---|---|---|---|---|
| | | | Byte 1, 2 | | | | |
| | | | . | | | | |
| | | | . | | | | |
| | | | . | | | | |
| | | | Byte 7, 7 | | | | |
| (END BLOCK 7 PAYLOAD) | | | Byte 7, 8 | | | | |
| L1 | L2 | L3 | L4 | L5 | L6 | L7 | C1 |
| C2 | C3 | C4 | C5 | C6 | C7 | C8 | C9 |

Example superblock optimized for double error detection with lowest latency and high efficiency

*FIG. 5A*

| (BEGIN BLOCK 1 PAYLOAD) | | | Byte 1, 1 | | | | |
|---|---|---|---|---|---|---|---|
| | | | Byte 1, 2 | | | | |
| | | | . | | | | |
| | | | . | | | | |
| | | | . | | | | |
| | | | Byte 8, 7 | | | | |
| (END BLOCK 8 PAYLOAD) | | | Byte 8, 8 | | | | |
| L1 | L2 | L3 | L4 | L5 | L6 | L7 | L8 |
| C1 | C2 | C3 | C4 | C5 | C6 | C7 | C8 |
| C9 | C10 | C11 | C12 | C13 | C14 | C15 | C16 |

Example superblock optimized for triple error detection and single error correction with low latency
where:  Byte j, k is the kth byte of the jth 64b/65b code in the superblock
Lj is the leading bit of the jth 64b/65b code in the superblock
Ci is the ith bit of the error control code over the superblock (CRC-9 here)

| Input Character | Lead bit | 64-bit field | | | | | | | |
|---|---|---|---|---|---|---|---|---|---|
| | | D1 | D2 | D3 | D4 | D5 | D6 | D7 | D8 |
| All data | 0 | D1 | D2 | D3 | D4 | D5 | D6 | D7 | D8 |
| 7 data/1 pad | 1 | 0 aaa Pd | D1 | D2 | D3 | D4 | D5 | D6 | D7 |
| 5 dt/2 cl/1 pd | 1 | 1 aaa C1 | 1 bbb Pd | 0 ccc C2 | D1 | D2 | D3 | D4 | D5 |
| 3 dt/3 cl/2 pd | 1 | 1 aaa C1 | 1 bbb C2 | 1 ccc Pd | 1 ddd C3 | 0 eee Pd | D1 | D2 | D3 |
| 1 data/7 pad | 1 | 1 aaa Pd | 1 bbb Pd | 1 ccc Pd | 1 ddd Pd | 1 eee Pd | 1 fff Pd | 0 ggg Pd | D1 |
| All pad | 1 | 1 aaa Pd | 1 bbb Pd | 1 ccc Pd | 1 ddd Pd | 1 eee Pd | 1 fff Pd | 1 ggg Pd | 0 hhh Pd |

*FIG. 8*

| Input Character | Lead bit | 64-bit field | | | | | | | |
|---|---|---|---|---|---|---|---|---|---|
| | | D1 | D2 | D3 | D4 | D5 | D6 | D7 | D8 |
| All data | 0 | D1 | D2 | D3 | D4 | D5 | D6 | D7 | D8 |
| 6 data/1 set | 1 | 0 aaa Es | OSC1 | D1 | D2 | D3 | D4 | D5 | D6 |
| 5 dt/1 st/1pd | 1 | 0 aaa Es | OSC1 | 1 bbb Pd | D1 | D2 | D3 | D4 | D5 |
| 4 data/2 setr | 1 | 1 aaa Es | OSC1 | 0 bbb Es | OSC2 | D1 | D2 | D3 | D4 |
| 4 dt/1 st/2 cl | 1 | 1 aaa Es | OSC1 | 1 bbb C1 | 0 ccc C | D1 | D2 | D3 | D4 |
| All pair | 1 | 1 aaa Es | OSC1 | 1 bbb Es | OSC2 | 1 ccc Es | OSC3 | 0 ddd Es | OSC4 |
| 6 data/1 set | 1 | 0 aaa Es | OSC1 | OSC1a | OSC1b | D1 | D2 | D3 | D4 |

*FIG. 9*

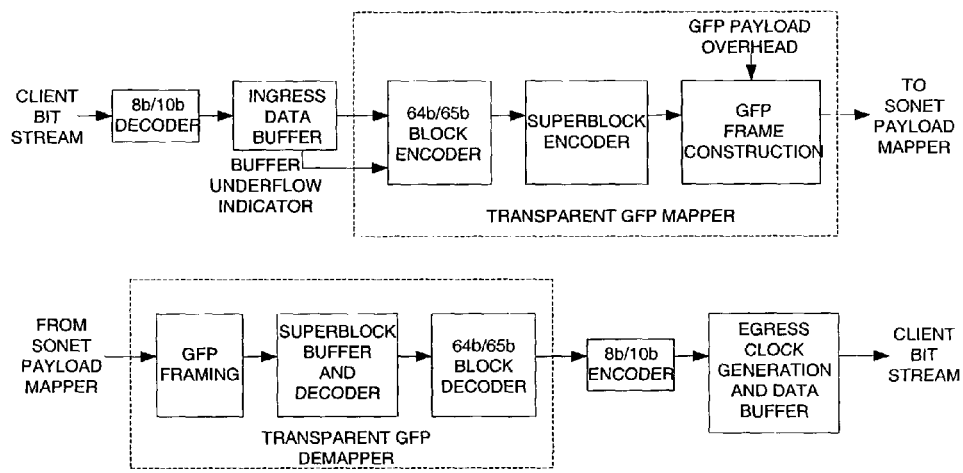

*FIG. 10*

APPARATUS AND METHOD FOR EFFICIENT DATA TRANSPORT USING TRANSPARENT FRAMING PROCEDURE

CROSS REFERENCE TO RELATED APPLICATIONS

This application claims priority from provisional patent application 60/303,331, filed 5 Jul. 2001 and incorporated herein by reference, including all attachments and references therein.

FIELD OF THE INVENTION

The present invention relates to communications using electronic and/or optical channels. More particularly, the present invention according to specific embodiments is related to a method and/or apparatus and/or system for transmitting a block-code-encoded communication for efficient transport on various networks.

COPYRIGHT NOTICE

Permission is hereby granted to make copies of this application and parts thereof solely in connection with the making of facsimile copies of this patent document in accordance with applicable law; all other rights are reserved, and all other reproduction, distribution, creation of derivative works based on the contents, public display, and public performance of the application or any part thereof are prohibited by the copyright laws.

APPENDIX

This application is being filed with two paper appendices totaling 39 pages, incorporated herein by reference. The appendix contains further discussion related to the art and further details regarding specific embodiments of the invention. The appendix further includes examples of integrated circuit devices that can incorporate methods according to specific embodiments of the invention.

BACKGROUND

Gigabit Ethernet

Gigabit Ethernet is a developing standard for high-speed data transmission, particularly LAN transmissions. Gigabit Ethernet allows connection between two devices in either a full-duplex or a half-duplex mode. In half-duplex mode, Gigabit Ethernet uses the CSMA/CD access method. In full-duplex mode, frame-based flow control as defined in the IEEE 802.3x standard is used. In current Gigabit Ethernet, a low layer converts transmitted data from an 8-bit binary representation into a 10-bit code-word. (This is sometimes referred to in the art, generally, as Block Code encoding.) The 10b codes are selected to guarantee a sufficient number of '1' bits (or bit transitions) to allow for clock synchronization. A Physical Coding Sublayer (PCS) examines incoming octets and encodes octets into a ten bit code. This is referred to as 8b/10b encoding.

In standard 8b/10b encoding, every ten bit code must fit into one of the following three possibilities: (1) five ones and five zeros; (2) four ones and six zeros; (3) six ones and four zeros. In some implementations, a special sequence of seven bits, called a comma, is used in aligning the incoming serial stream. The comma can also be used in acquiring and maintaining synchronization. The comma generally can not be transmitted across the boundaries of any two adjacent code groups unless an error has occurred, though in some implementations it may be handled as one type of control code.

In Gigabit Ethernet, DC balancing is achieved through the use of a running disparity calculation. Running disparity is designed to keep the number of ones transmitted by a station equal to the number of zeros transmitted by that station. Running disparity can take on one of two values: positive or negative. In the absence of errors, the running disparity value is positive if more ones have been transmitted than zeros and the running disparity value is negative if more zeros have been transmitted than ones since power-on or reset.

Control Codes

In one commonly used version of 8b/10b, there are twelve special control codes that may be encoded into ten bits. Thus, another advantage in using 8b/10b encoding is the ability to use special code-words in the 8b/10b schema that would be impossible if no encoding was performed.

Other References

T1X1 standards contribution T1X1.5/2000-197 and - 197R1

Email from Sycamore Networks on 64b/65b codes
http://www.eetasia.com/ART_8800031665_499481, 590626.HTM http://www.oreilly.com/reference/dictionary/terms/1/8B_10B.htm http://www.oreilly.com/reference/dictionary/terms/E/Encoding.htm U.S. Pat. No. 4,665,517 (Widmer, IBM) May 12, 1987, Method Of Coding To Minimize Delay At A Communication Node.

SUMMARY

According to various specific embodiments, the present invention involves a more efficient method and/or system and/or apparatus for mapping a protocol including data and a limited number of control codes (such as that found in standard 8b/10b Gigabit Ethernet) to an efficient encoding protocol for carrying on various other networks (for example, WAN systems such as SONET or OTN). According to specific embodiments of the invention, the invention decodes the 8b/10b data to 8b data, and then maps the data into transparent GFP frames or blocks and can further map the frames into superblocks of frames. According to further embodiments, the invention involves adding padding characters on the fly to constructed blocks to reduce buffering needed and to reduce variable delay created during frame construction, which in some embodiments can also provide easier clock recovery. In further embodiments, a pad character is encoded using the same system used for encoding 8b/10b control codes. In further aspects according to specific embodiments of the present invention, the invention provides for superblocks that allow alignment between incoming data and transmitted superblocks allowing for simplified data paths. In further aspects according to specific embodiments of the present invention, the invention provides for improved error detection and/or correction by using a superblock structure and performing error correction/detection over that structure.

Thus, the present invention provides low latency through the Transparent GFP mapper/demapper pair. The invention, according to specific embodiments, also provides a method of performing framing of data with minimum buffer requirements.

In further embodiments, the invention allows robust transport of control codes. In still further embodiments, the invention has the ability to derive the source data clock, for example at a demapper circuit, with minimum complexity.

A further understanding of the invention can be had from the detailed discussion of specific embodiments and specific products incorporating aspects of the invention as discussed herein and the included references. For purposes of clarity, this discussion refers to devices, methods, and concepts in terms of specific examples. However, the method of the present invention may operate with a variety of types of devices and equipment and in a variety of applications. It is therefore intended that the invention not be limited except as specifically provided in the attached claims.

Furthermore, it is well known in the art that logic systems and methods such as described herein can include a variety of different components and different functions in a modular fashion. Different embodiments of the invention can include different mixtures of elements and functions and may group various functions as parts of various elements. For purposes of clarity, the invention is described in terms of systems that include many different innovative components and innovative combinations of innovative components and known components. No inference should be taken to limit the invention to combinations containing all of the innovative components listed in any illustrative embodiment in this specification.

For the sake of clarity, the invention will be explained herein with respect to specific embodiments, in some cases including specific numbers of such elements as buffers, communication lines, registers, bit widths, or other components. It will be clear from the teachings herein to those of skill in the art that the invention may be deployed in many alternative logic applications. It is inherent in the art that logic devices and processes and communications devices can be highly variable in the arrangement and configuration of different components. Described examples should therefore been taken as illustrations and not seen as limiting the invention. In order to facilitate description, the following discussion will describe the present invention at times in terms of particular communication systems and/or protocols. However, the methods of the present invention are applicable to other systems or protocols.

Functional aspects of the invention that are implemented on a computer or computer circuitry, as will be understood from the teachings herein, may be implemented or accomplished using any appropriate implementation environment or programming language, such as C, C++, C#, Cobol, Pascal, Java, Java-script, assembly or machine code programming, custom logic circuits and languages for specifying same (such as RTL and other logic design languages) etc. In some embodiments, methods and/or systems described or claimed herein may be wholly or partly incorporated into a programmed information device, either for emulation or usage purposes. In other embodiments, methods and/or systems described or claimed herein may be wholly or partly incorporated into a logic circuit, such as a custom logic circuit (e.g., an ASIC) or an programmable logic device such as a PLA or FPGA.

All references, publications, patents, and patent applications cited herein are hereby incorporated by reference in their entirety for all purposes.

The invention may be used in a variety of applications and situations involving data communications. The present invention may also be incorporated into an integrated circuit (IC) or communication system to improve transmission of digital data.

Descriptions of Some Terms Used Herein

The present invention in various embodiments can be described in terms of encoding and/or mapping digital data that is being transmitted. In a typical application, the present invention accomplishes transmitting digital data from one encoding scheme to another encoding scheme. For purposes of this discussion, a number of terms are used herein to describe different types of encoding and data organization. A description of some of these terms is provided below. However, these definitions are intended to not be limiting but to further supplement the understanding of this discussion. It is also well-known in the art that many commonly used terms in the art, e.g., framing, packets, datagrams, messages, etc., are not always used precisely or consistently. Precise meanings of these terms vary in different discussions.

Block Code encoding. As used herein, this type of encoding refers to encoding where a number of bits are added to a bit group (such as a byte/octet or several bytes) in order to achieve a desired result or property. The 8b/10b encoding scheme described above is one example, wherein each 8-bits of original data is encoded into a 10 bit code in order to ensure a number of bit transitions and for DC balance. Other Block Code encoding schemes include various asynchronous byte transmission schemes, wherein each byte is preceded by one or more start bits and may also be followed by a ending bit. A variety of other Block Code encoding schemes are possible, including schemes that are based on more of fewer that 8-bit original 8b data. 64b/65b encoding is also sometimes referred to as block code encoding.

Framing. This term generally refers to dividing data for transmission into groups of bits (groups of bytes or words or codes), and adding a header and a check sequence to form a frame. A frame is generally the largest unified unit of transmission above the bit-level that is transmitted by a particular type of transmission network and that contains all of the payload and overhead data needed to transmit the unit on that particular type of transmission network. Thus, in the art, practitioners can refer to an Ethernet MAC frame, a Gigabit Ethernet frame, a SONET frame, etc. Sometimes, framing is used more loosely to refer generally to higher layer transmissions.

Code or Code-word. Generally refers to an encoded unit of data transmission. The term "word" is used at times herein to indicate that the code is usually larger than an octet (or byte.) The term code indicates that the code-words include some type of encoding derived from original data. Thus, in 8b/10b, the original 8-bit byte is transformed into a 10-bit code or code-word. In the 64b/65b example discussed above, the 65-bit unit can be referred to as a code-word or is sometimes referred to as a code. As used herein with reference to the present invention, a 64b/65b code-word is preferably referred to as a block.

Superblock. In specific example embodiments as used herein, denotes a group of blocks (or code-words) combined into a larger block optionally with additional data for such purposes as error correction/detection. In the present invention, the primary purpose of the superblock structure is to preserve byte alignment between the block code-word data bytes and the transmission system.

BRIEF DESCRIPTION OF THE DRAWINGS

FIG. 1 illustrates an example of a 64b/65b encoding scheme that has disadvantages that are overcome according to specific embodiments of the present invention.

FIG. 2 illustrates an example control code mapping scheme that can be used according to specific embodiments of the present invention.

FIG. 3 illustrates an example new block encoding structure to improve byte alignment within the block payload according to specific embodiments of the present invention.

FIG. 4 illustrates an example basic superblock according to specific embodiments of the present invention.

FIG. 5A illustrates an example basic superblock structure to allow double-error detection along with byte alignment according to specific embodiments of the present invention.

FIG. 8 illustrates an example new block encoding structure including encoding for pad characters to improve byte alignment within the block payload according to specific embodiments of the present invention.

FIG. 9 illustrates an example new block encoding structure including encoding for pad characters and ordered pair encoding to improve byte alignment within the block payload according to specific embodiments of the present invention.

FIG. 10 illustrates an example block diagram showing logic components for client bit stream encoding and decoding according to specific embodiments of the present invention.

BRIEF DESCRIPTION OF ATTACHED APPENDICES

Figures 5B, 6:
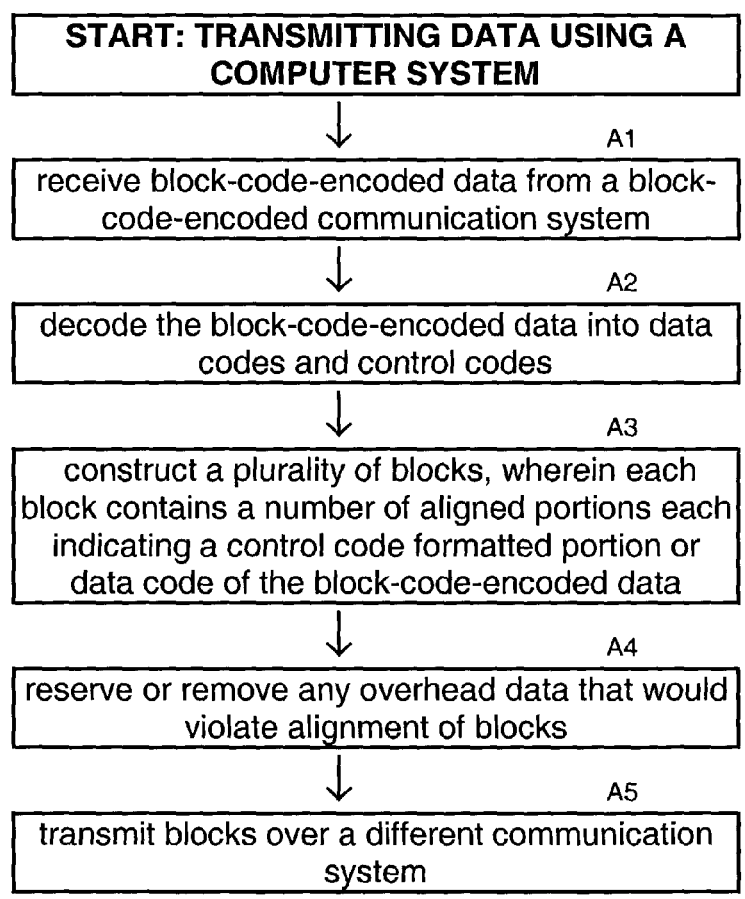
FIG. 5B illustrates example basic superblock structures to allow triple-error detection along with byte alignment according to specific embodiments of the present invention.
FIG. 6 is a flowchart illustrating a general method of transmitting data using blocks (or code-words) using an information processing device according to specific embodiments of the present invention.

Appendix A illustrates and discusses an example integrated product that can incorporate aspects of the invention according to specific embodiments. More specifically, Appendix A is a draft specification sheet for PM5325, an integrated circuit that can embody the invention according to specific embodiments. In this example, methods discussed in this application will be generally performed within a decoding and encoding processing module such as L1, with other circuit components participating in completing data transmissions.

Appendix B is a publication draft standards specification for a Generic Framing Protocol according to specific embodiments of the present invention. This appendix provides further details of various embodiments of the invention as discussed herein. This appendix also provides some explanation of background information.

DETAILED DESCRIPTION OF SPECIFIC EMBODIMENTS

According to specific embodiments, the present invention provides a method and/or system able to perform effective translation from one type of digital communication encoding protocol to a different digital communication encoding protocol.

Byte-aligned framing according to specific embodiments of the invention provides a less complex implementation of GFP, especially in the data path construction. In particular embodiments, the invention eliminates the need for barrel shifting to align the data within the data path. The invention according to specific embodiments also allows byte-level observability of data bytes within the SONET stream. According to further embodiments, the invention can accommodate special situations such as loss of client signal or receipt of unrecognized codes at a mapper.

GFP Proposals

A problem to be solved in connecting Gigabit Ethernet (which is often considered a LAN or local area network protocol) to other network protocols (often considered WAN or wide area network protocols, such as, for example SONET or OTN (optical transport network)) is the efficient transport of block-code-encoded signals (such as 8b/10b) across the other network. To increase efficiency, the block-code-encoded code can be decoded so that the data and control characters can be transmitted using a more band-width efficient code. Various transport protocols (e.g., ESCON, Fibre Channel, and Gigabit Ethernet) have strict transport latency requirements as well as bit error rate requirements. For example, such protocols are especially vulnerable to transmission channel errors that affect the control codes.

To address this problem, participants in the art have suggested a number of different framing protocols for carrying 8b/10b data over a generally higher-speed and generally WAN network such as SONET. It has been proposed to develop a Generic Framing Procedure (GFP) that will specify how any type of incoming data (sometimes referred to as client data frames) will be translated into data units (or frames) to be transmitted on the optical (such as SONET) or other high-speed network. An early frame-mapped GFP proposal encapsulates one client data frame into each GFP frame. However, this approach adds too much transmission latency for many applications because each GFP frame has to be transmitted along with overhead data for transmission on the GFP network.

Ideally, transparent GFP performs the transport by mapping client (e.g., the source of the data) characters into the GFP frame and uses the GFP framing to indicate the character alignment of the transport layer of a WAN (such as SONET or OTN) payload envelope. GFP frames are delineated by their headers. In one example, a GFP header consists of a two-byte length field that indicates the length of the GFP frame and a two-byte CRC-16 error check code over the length field. Appendix A provides examples related to GFP header information. The GFP demapper looks for valid 4-byte groups (i.e., two bytes followed by a valid CRC-16 over those bytes) and then uses the length field to verify that the next frames starts where it was expected to start.

An early Transparent GFP proposal (from Nortel and Lucent) decoded the 8b/10b data codes into the original 8-bit values and inserted them into GFP frames and attempted to map a client frame into a GFP frame. The 8b/10b control codes were mapped into special, short GFP frames. This approach for control codes was inefficient and required a high degree of client protocol awareness. The data mapping added a substantial latency because of the need to buffer a client data frame prior to mapping it into a GFP frame. This approach provided for error detection and correction on the control codes by choosing a set of mappings with adequate Hamming distance.

Another proposal (by Sycamore Networks) is to decode the 8b/10b characters and re-map them into 64b/65b codes. FIG. 1 illustrates an example of a 64b/65b encoding scheme that has disadvantages that are overcome according to specific embodiments of the present invention. Data characters (which for these purposes are any 8 bit values) are decoded and mapped as their 8-bit data values. (The data bytes are indicated as D1 through D8 in FIG. 1.) 8b/10b control codes (of which there are twelve presently defined) are mapped into 4-bit codes (indicated as C1 through C8 in FIG. 1) using a table look-up or other appropriate mapping routine. Appendix A provides further examples of mapping of control codes. Flag bits after the leading bit indicate the number of control codes contained within a particular 64b/65b code (or block or code-word) (Flag bits are shown as O's and 1's in FIG. 1.) The original position of the control codes within the 8b/10b data stream are indicated by 3-bit position fields following the flag bits (Shown as aaa, bbb, ccc, ddd, eee, fff, ggg, and hhh in FIG. 1.) The 3-bit fields allow indicating whether its corresponding control code was the $1^{st}, 2^{nd}, 3^{rd}, 4^{th}, 5^{th}, 6^{th}, 7^{th}$, or $8^{th}$ position in the 64b/65b code. In this proposal, if the leading bit of the 65-bit code is a 0, then all eight payload bytes contain data characters. If the leading bit is a 1, then there is at least one control code present in the 64-bit payload.

More generally, as illustrated in FIG. 1, the 65b codeword can begin with a string of 1's (zero to eight 1's long) followed by a "0", with one "1" for each control code present in the 64 bit payload. After the first "0" comes a series of 3-bit position fields (or addresses) that indicate the original location of the control codes within the 8 characters. After the string of addresses comes a series of 4-bit values representing the control codes.

There are a number of drawbacks to this proposal. First, the 65 bit codes do not byte align with desired WAN signals (such as SONET or OTN.) Further, when control codes are present, the control character locations are not byte-aligned within the 64 bit field. The approach allows mapping characters instead of whole client data frames into GFP frames, which gives the potential for less latency by a priori knowledge of the GFP frame length. This approach requires, however, adequate ingress buffer fill at the mapper to insure that there is enough data to fill up the GFP frame. A further drawback of this approach is that it provides no capability to detect or correct errors that may occur over the SONET or OTN link.

1. Byte Alignment

According to specific aspects of the present invention, the invention provides byte-alignment of the transmitted GFP frames. Achieving byte-alignment simplifies the data path design and simplifies testing of integrated circuits (ICs) implementing various aspects of mapping or demapping. In particular implementation, byte alignment with the SONET/OTN payload bytes also simplifies SONET signal analysis.

In one example, a basic underlying structure used for an implementation of the invention is the previously discussed 64b/65b code-word. According to specific embodiments of the present invention, the structure of this code is utilized as a leading bit followed by eight payload bytes or, more generally, eight aligned portions. In earlier proposals, the beginning of the 64-bit payload did not have alignment relative to the 64-bit field of the original data.

FIG. 3 illustrates an example new block encoding structure to improve byte alignment within the block payload according to specific embodiments of the present invention. Using this example, according to specific embodiments of the present invention, byte alignment of the 64b/65b code is achieved in two steps. First, the control code information representation within the 64 bit payload is byte aligned. In one example, when a control code is present, the first nibble of the first byte contains a flag bit to indicate whether this is the only (or final) control code in the aligned portion (or payload) and the 3-bit address of the control code's original location. The second nibble contains the 4-bit control code value. If additional control codes are present, they follow in sequence using the same format. In this manner, as illustrated in FIG. 3, all the information concerning a control code (e.g., its location address and its value) can be contained within an aligned byte. Furthermore, according to specific embodiments of the present invention, that byte also provides an indicator of whether there are more control codes in the payload. It will be clear from the teachings herein that the control code payload and address data could be differently arranged within its byte aligned bytes according to specific embodiments of the present invention. For example the order of the value, location and the continuation bit could be changed or any of those values could be differently encoded.

2. Superblocks

In a further aspect according to specific embodiments of the present invention, a second stage of achieving byte alignment is done by grouping the leading bits of multiple 64b/65b blocks into a one or more bytes or byte portions separate from the payload portions of multiple 64b/65b blocks. For example, the leading bits of eight blocks can be grouped into a trailing byte following the payload bytes of the first through eighth blocks. In this manner, the data remains byte-aligned. According to specific embodiments of the present invention, the grouped payloads and the leading bits grouped together are referred to as a superblock. FIG. 4 illustrates an example basic superblock according to specific embodiments of the present invention. This particular illustrated example is 65 bytes long, with the first 64 bytes being data bytes of eight 64b/65b blocks, and the final byte being the leading bits for the eight 64b/65b blocks.

Other implementation options for placement of the grouped block leading bits in superblocks according to specific embodiments of the present invention are possible. Thus, alternatively the leading code bits could be grouped into a leading byte prior to the payload bytes. Using a leading byte for the leading bits requires buffering all of the codes for that superblock at the encoder and allows the decoder to output the data for each block immediately as it is received. Using a trailing byte allows the encoder to begin transmitting each block as soon as the 64B payload is determined and requires the receiver to buffer the entire superblock in order to get the block leading bits. The leading byte approach has some latency advantage (e.g., in one specific embodiment, 7 bytes) between the mapper and demapper if no error correction is being used. If error correction is employed, as discussed below, the decoder will generally buffer the entire superblock for error correction, and in this case it is better in some embodiments to use the trailing byte to minimize the encoder delay.

Figure 7:
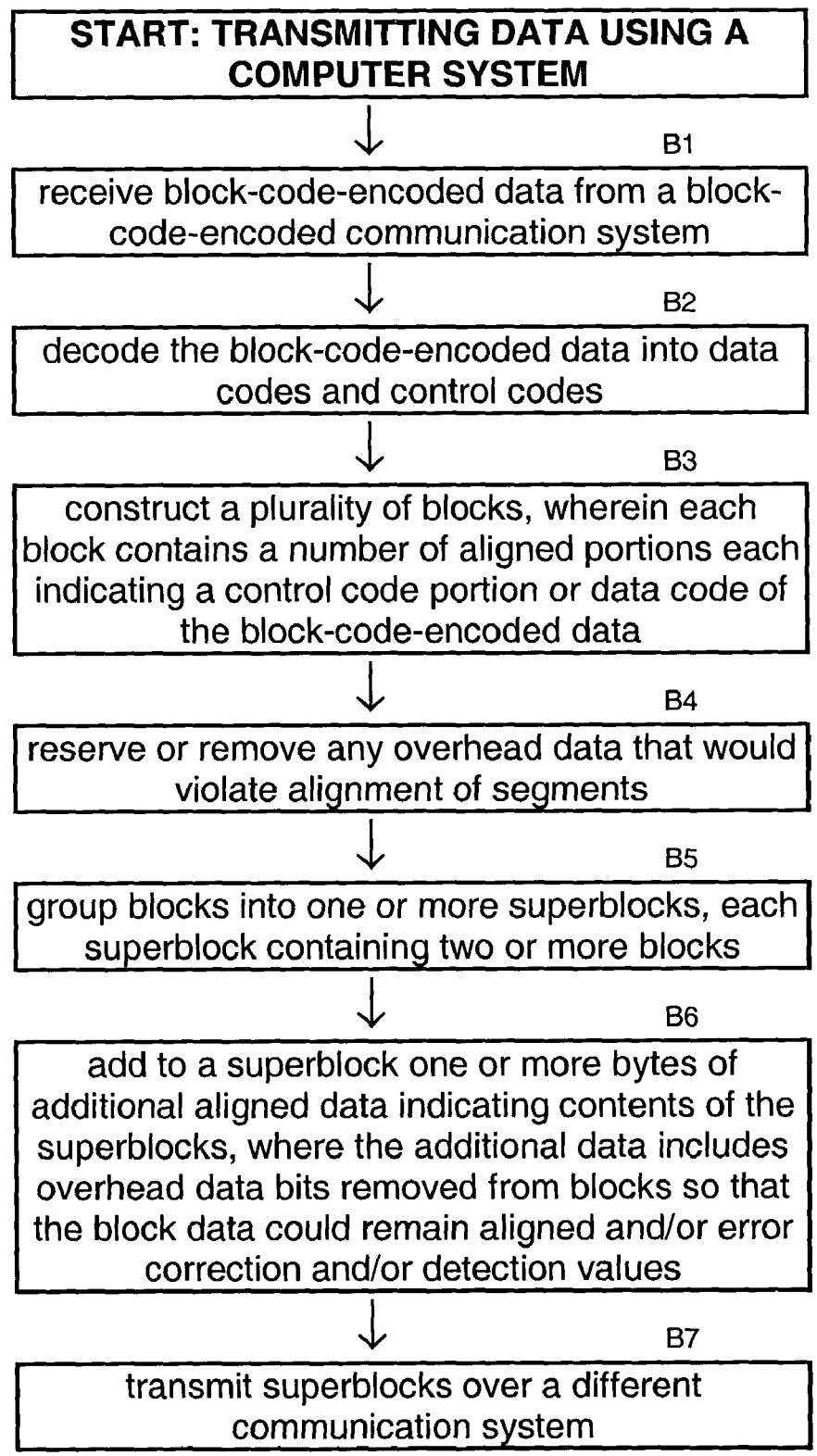
FIG. 7 is a flowchart illustrating a general method of transmitting data using superblocks using an information processing device according to specific embodiments of the present invention.

FIG. 6 is a flowchart illustrating a general method of transmitting data using blocks (or code-words) using an information processing device according to specific embodiments of the present invention. FIG. 7 is a flowchart illustrating a general method of transmitting data using super-blocks using an information processing device according to specific embodiments of the present invention.

3. Pad Characters

According to further specific embodiments of the present invention, other techniques can be used to reduce the amount of latency. The first is the ability to begin transmission of the GFP frame prior to having buffered an entire GFP frame of data. Because the beginning header of a GFP frame contains the indication of the length of the frame the invention according to specific embodiments treats the frame length for a current frame as predetermined when transmission begins. If it is desired to begin transmission of data before an entire GFP frame's worth of data is present in an encoder, a danger in using a predetermined GFP frame length is ingress buffer underflow, because insufficient data may arrive from an input to fill a GFP frame in the time allotted for GFP transmission.

A typical method of avoiding underflow is to make sure that there are enough client data bytes in the ingress buffer prior to transmission of the GFP frame so that the mapper will not run out of client data prior to the end of the GFP frame. GFP idle frames may be transmitted whenever the ingress buffer does not contain an adequate amount of client data at the beginning of a new GFP frame. There are at least three drawbacks to using this ingress buffer threshold approach. The first is that it adds latency due to the need to have multiple bytes in the buffer. The second is that it leaves the mapper unable to complete transmission of the frame if there is a loss of the client signal. The third drawback relates to clock recovery, as discussed below.

Another known method of avoiding underflow is to use some type of padding characters in the transmission whenever there is insufficient data to complete a desired frame. However, an entirely satisfactory padding scheme compatible with GFP proved difficult, as again all bits of the data payload bits were used to represent values in the original data stream.

To eliminate these problems, the present invention in specific embodiments, uses a pad character that is inserted by the mapper during block construction whenever the ingress buffer does not have a client data byte available for mapping. The pad character is inserted in a block analogously to a client control code, using one of the available 4-bit control code values that is not otherwise used for defined 10b/8b control codes. The demapper recognizes this control code as being a pad character and removes it. Thus, if a loss or interruption of the client signal occurs, of either a single byte or many, a mapper according to specific embodiments of the present invention can automatically immediately handle the situation by inserting pad characters. There is essentially no additional latency or processing required as the logic used to insert pad characters is largely identical to that used to insert control characters, the only difference being that the input causing insertion is detected buffer underflow instead of a detected control code.

According to further specific embodiments of the present invention, this pad character mechanism reduces the mapper and demapper buffer requirements. Therefore, in some implementations needed buffering is determined by the amount of client data that can arrive during transmission of the GFP frame overhead.

FIG. 8 illustrates an example new block encoding structure including encoding for pad characters to improve byte alignment within the block payload according to specific embodiments of the present invention. As illustrated in this example, pad characters are placed in a designated portion of the block and include a position field to indicate where the pad was actually inserted in the received byte stream. Pad characters can be inserted along with control characters in a particular block as shown in the figure. The "Pd" designation in the figure indicates a single control code representing a pad character, though in other embodiments more than one code can be used to indicate padding, for example to indicate padding inserted due to different conditions.

4. Error Correction to Minimize Latency and Buffering

The second factor affecting latency is the amount of data that must be buffered for the purposes of error correction. Earlier GFP proposals included having forward error correction (FEC) bits at the end of an entire GFP frame, or, equivalently, use the payload error detection bytes at the end of the GFP frame to decide whether to discard the frame due to errors. In either case, the entire GFP frame must be buffered at either the mapper, demapper, or both.

The present invention reduces disadvantages associated with the method by placing error correction EC bits within a superblock. Thus, a self-contained superblock is maintained with respect to both byte alignment and error correction. Adding EC to the group reduces the mapping and demapping buffer requirements to one superblock of data characters. For example, the total buffering requirements with a (464, 455) BCH code are approximately 20 bytes in the ingress buffer (i.e., the amount of client data that can arrive during the GFP frame overhead (12 bytes) plus the amount of data in a 64b/65b block (8 bytes)), 56 bytes for the mapper, 56 bytes for the demapper, and a few bytes for the egress output buffer clock alignment circuit. Under the previous proposals, for the example of Gigabit Ethernet, the buffer requirements would be over 800 bytes at the demapper and between 16 and 800 at the mapper.

Thus, according to specific embodiments of the present invention, the invention provides a GFP mapper/demapper with a fine-grained error correction.

According to further specific embodiments of the present invention, in order to achieve improved error performance, the size a superblock can be chosen such that there are a desired number of bits remaining in the trailing and/or leading portions of a superblockthat can be used for error detection or correction. A number of examples are presented below to indicate how different EC schemes can be used with different superblock sizes.

EXAMPLE 1

To achieve single error detection, group four 64b/65b blocks code-wordwith a final byte consisting of the four leading bits of the 64b/65b blocks and a CRC-4 check over the bits in the superblock.

EXAMPLE 2A

To achieve double error detection, group seven 64B/65B code-words with the first trailing byte containing the seven leading code bits. The remaining bit in the first trailing byte and a second trailing byte contain the bits for a CRC-9 check over the group. Example 2A is illustrated in FIG. 5*a*. In this figure, the first 56 bytes of the superblock contain data from seven 64b/65b code-words. The next seven bits (L1–L7), contain the leading bit information for those seven codes, and the final nine bits (C1–C9) contain the 9-bit error control code over the superblock.

EXAMPLE 2B

To achieve triple error detection with single error correction, group eight 64B/65B code-words with a first trailing byte containing the eight leading code bits. The remaining two trailing bytes contain a CRC-16. Example 2B is illustrated in FIG. 5b. In this figure, the first 64 bytes of the superblock contain data from eight 64B/65B code-words, bits L1–L8 contain the leading bit information from those eight codes, and bits C1–C16 contain the CRC-16. This superblock was chosen for use in the ITU-T G.7041/Y.1303 GFP recommendation.

EXAMPLE 3B

To achieve single error correction, use the same format as example 2, except use a 9-bit shortened BCH-1 (464, 455) code instead of a CRC-9.

EXAMPLE 3B

Alternatively, to achieve single error correction, group eight code-words with their leading bits comprising the first trailing byte. The second and third trailing bytes comprise a shortened Reed-Solomon (67, 65) code over the group.

EXAMPLE 4

To achieve double error correction, group twelve code-words with their leading bits comprising the first trailing byte and half of the second trailing byte. The remainder of the second trailing byte and the third and fourth trailing bytes contain a shortened BCH-2 code (800, 780) over the group.

5. Client Data Clock

The egress client data clock can either be derived from the rate of the data received over the SONET link (desynchronizer approach) or can be estimated to be the same as the clock received from the client interface signal coming into that port. If the desynchronizer approach is used, the more constant the incoming data stream is, the easier to determine the original client data rate. The use of the pad character to adjust for the mismatch between the SONET channel capacity and the client data rate simplifies the desynchronizer implementation by limiting the rate adjustments to a single byte rather than the four byte minimum increment from a GFP idle frame.

6. Ordered Sets

According to further embodiments of the invention, one of the 4-bit control codes is defined as the first byte of a multi-byte (such as two) ordered set. This allows specific embodiments of the invention to handle special conditions, such as indicating loss of client signal to a demapper or handling unrecognized client 8b/10b characters. The escape code indicates the ordered set including the position field that the unrecognized client 8b/10b character occupied, and the following byte indicates the condition or unrecognized character.

For example, for loss of client signal, the second byte code indicates the loss of signal. As a further example, if an unrecognized 8b/10b character is received by the mapper, the unrecognized 8b/10b character be mapped into one of the possible values of the second ordered set byte. The demapper can then reconstruct the original signal.

FIG. 9 illustrates an example new block encoding structure including encoding for pad characters and ordered pair encoding to improve byte alignment within the block payload according to specific embodiments of the present invention. As illustrated in this example, escape (ESC) characters are placed in a designated portion of the block and include a position field to indicate the position of the occurrence of the following value in the ordered set in the received byte stream. ESC characters can be inserted along with control characters, data characters, or pad characters in a particular block as shown in the figure. The "Es" designation in the figure indicates a single escape control code representing an escape character, though in other embodiments more than one escape code can be used, for example to indicate a further set of ordered pair values. In further embodiments, and initial ESC character may be followed by a value that indicates that further other values are part of the ordered set, as illustrated at the end of the figure.

7. System Block Diagram

FIG. 10 illustrates an example block diagram showing logic components for client bit stream encoding and decoding according to specific embodiments of the present invention. This figure can be understood as representing separable logic modules in a logic systems or functions in an integrated system that may be described separately. As shown in the figure, according to specific example embodiments of the present invention, a client bit stream is first received by a decoder that decodes that initial block encoding (e.g., 8b/10b). An ingress buffer receives the decoded bytes and communicates with a block encoder that will prepare data blocks for transmission on a second communication system (e.g., a WAN such as an optical network). The block encoder constructs blocks at the desired data rate, including optionally performing the control code encoding, ordered set encoding, and padding described above. In this example, an underflow indicator is shown to let the block encoder know that a padding character is necessary. In other embodiments, this may not be a separate signal, but may for example be an error condition detected by the block encoder when it requests data.

Once the block encoder has completed a block, it passes the aligned portions of the block and any non-aligned data to a superblock encoder. The superblock encoder operates as described above to group blocks in order to send fully byte-aligned superblocks. Optionally, the superblock encoder also adds error detection and/or correction as described above. The superblocks are then transferred to a GFP frame constructor to add further overhead for transmission on the second network as described in documents referenced herein.

After transport on the second network (e.g., SONET) a reverse procedure is performed. First the GFP framing is removed and superblocks are transferred to a decoder that performs the error check and/or correction and passes blocks including their unaligned portion to block decoder, which passes the blocks to a be encoded into the desired block code (such as 8b/10b or some other block code) desired at that end of the network. In part as a result of the rapid and on-the-fly padding performed by the invention, clock generation at the egress buffer is simplified as further described herein and in referenced documents.

8. Embodiments in a Programmed System

The invention can be implemented in hardware and/or software. The invention may be embodied in a fixed media or transmissible program component containing logic instructions and/or data that when loaded into an appropriately configured computing device (such as network communication device) causes that device to perform according to the invention.

Figure 11:
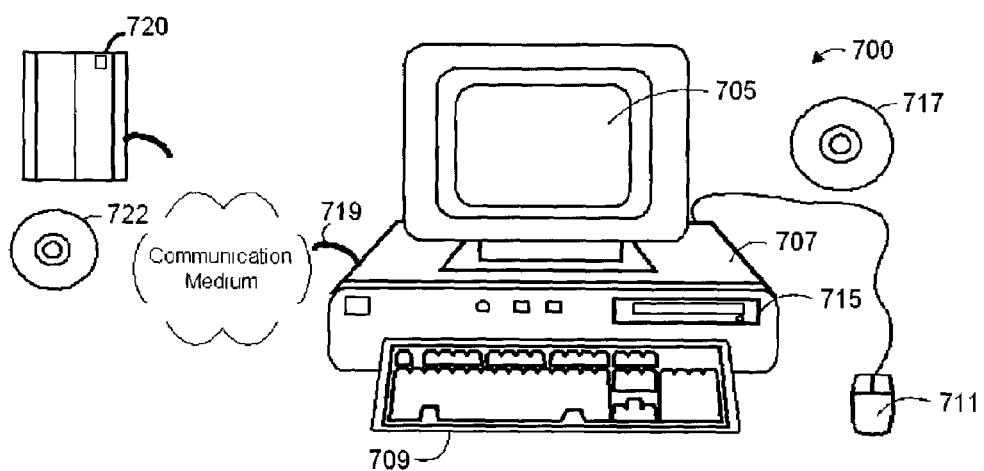
FIG. 11 illustrates an example of a type of computer system that can embody aspects of the invention according to specific embodiments of the invention.

FIG. 11 shows digital device 700 that may be understood as a logical apparatus that can read instructions from media 717 and/or network port 719. Apparatus 700 can thereafter use those instructions to direct a server or communication device or application as is known in the art and that further includes the components of the invention. One type of logical apparatus that may embody the invention is a computer system as illustrated in 700, containing CPU 707, optional input devices 709 and 711, disk drives 715 and optional monitor 705. Fixed media 717 may be used to program such a system and may represent a disk-type optical or magnetic media or a memory. The invention may be embodies in whole or in part as software recorded on this fixed media. Communication port 719 may also be used to program such a system and may represent any type of communication connection. Thus device 700 can be understood as an communication system, a part of a communication system, or a modeler or emulator for a communication system.

9. Embodiments in an Integrated Circuit

According to specific embodiments, the present invention can be embodied in various integrated circuit components that are used in communication or networking systems in accordance with one of more of the methods taught herein. Examples of such components are provided in the attached appendix, but any type of integrated circuit or logical device or system incorporating an integrated circuit or logical device may embody the invention as described with respect to the methods taught herein. Such devices can include, but are not limited to, application specific integrated circuits (ASIC) or systems incorporating such circuits; programmable logic devices (PLD) or systems incorporating such devices; advanced communication integrated circuits or systems incorporating such circuits; microprocessor circuits or systems incorporating such circuits, etc.

Figure 12:
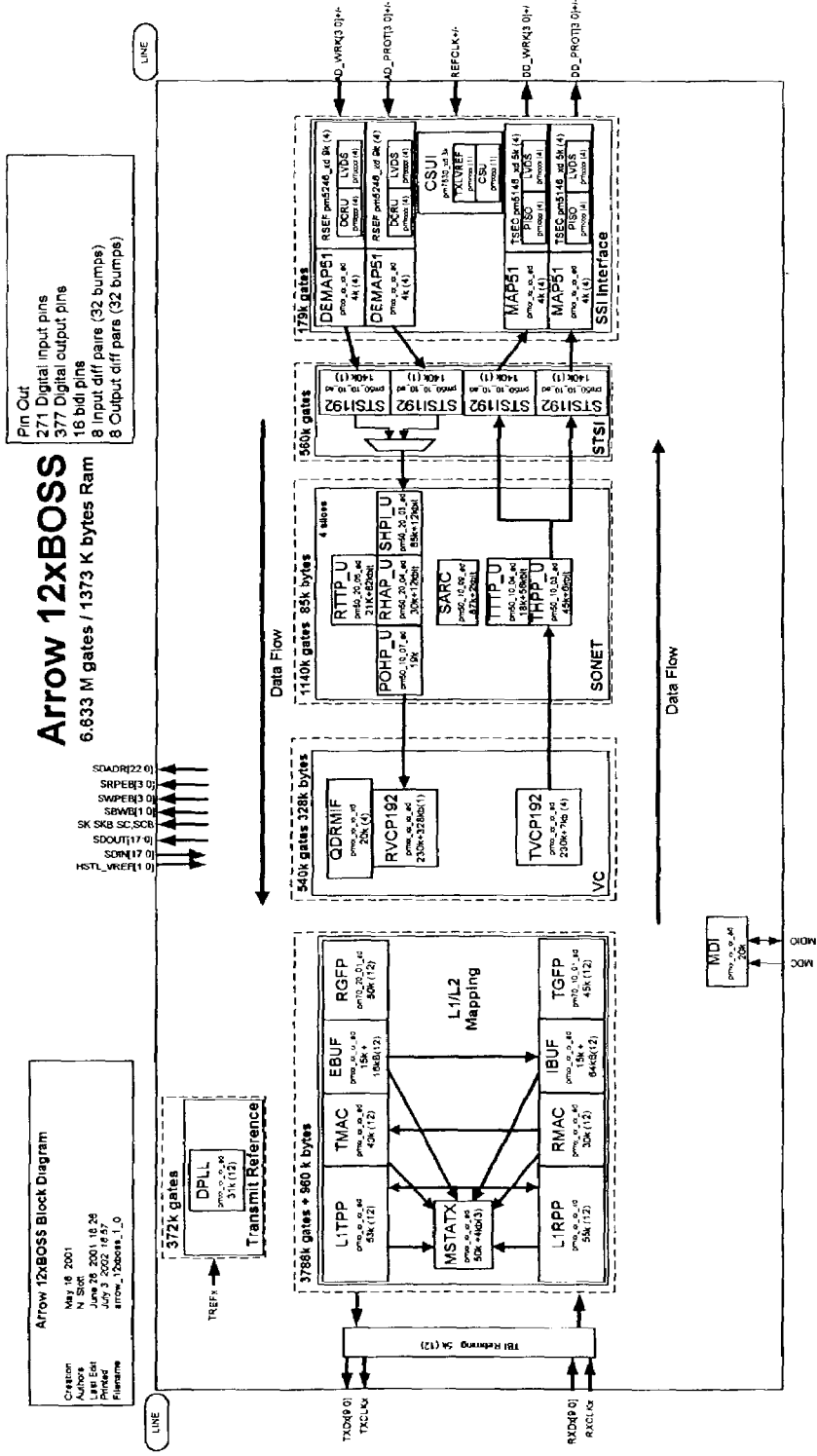
FIG. 12 illustrates an example block diagram of an example communication device and/or integrated circuit device that can embody aspects of the invention according to specific embodiments of the invention.

In particular, the present invention can be incorporated into an IC such as that described in the attached draft advance product sheet for PM5325. In this circuit, the invention as taught herein is incorporated into the Ingress and Egress Mappers shown and in the L1/L2 Mapping modules. Appendix A illustrates and discusses an example integrated product that can incorporate aspects of the invention according to specific embodiments. FIG. 12 illustrates an example block diagram of an example communication device and/or integrated circuit device that can embody aspects of the invention according to specific embodiments of the invention.

The invention may also be embodied in various virtual communication systems such as communication system performance simulators that are known and may be used "prefabrication" to validate or simulate logical designs, such as designs implemented in computer understandable descriptor language.

10. Other Embodiments

The invention has now been explained with reference to specific embodiments. Other embodiments will be apparent to those of skill in the art. While methods according to specific embodiments of the invention are explained above through specific examples, such as 8b/10b to 64b/65b encoding, it will be understood from the teachings herein that the invention can also be used in other applications where data is translated from one format to another. The appendix also illustrates various system embodiments according to specific embodiments of the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method of transmitting data from a block-code-encoded communication system to a different communication system comprising:
   receiving a stream of block-code-encoded data;
   decoding said stream into data codes and control codes;
   constructing a code-word, wherein each code-word contains M aligned portions;
   wherein each said aligned portion can indicate a control code or a data code from said stream;
   removing overhead data that would violate alignment of said M aligned portions to be transmitted outside of said code-words;
   arranging one or more control codes if present within said code-word such that said control codes are aligned and unit-contained in said code-word; and
   transmitting said code-word and said overhead data over said different communication system.

2. The method according to claim 1 further comprising:
   inserting a pad character with a pad character position field into a code-word in order to complete said code-word when there is insufficient received data from said block-code-encoded communication system, such that said pad character and pad character position field are aligned and unit-contained in said code-word.

3. The method according to claim 1 further comprising:
   placing an escape character and ordered set value or values within a code-word to handle loss of client signal and/or unrecognized client characters.

4. The method according to claim 3 further wherein:
   said escape character has associated in its aligned portion a position field, said position field indicating a position related to said ordered set value or values.

5. The method according to claim 1 further wherein:
   said one or more control codes if present are arranged in a byte-contained and byte aligned format containing a control code value, a position field, and a continuation field;
   further wherein said byte-contained and byte aligned format can also be used to contain a pad character, pad character position field, and a continuation field; and
   further wherein said byte-contained and byte aligned format can also be used to contain an escape character, ordered set value position field, and a continuation field.

6. The method according to claim 1 further comprising:
   grouping said plurality of code-words into one or more superblocks, each superblock containing S code-words, where S>2;
   adding to a superblock one or more units of additional aligned data indicating contents of said superblocks, wherein said additional data includes overhead data removed from said code-words so that said code-words can be aligned; and
   transmitting said superblock over said different communication system.

7. The method according to claim 6 further wherein:
said additional aligned data indicating includes values providing for error detection and/or correction.

8. A integrated communication circuit able to perform the method as described in claim 1.

9. A communication system comprising at least one integrated circuit able to perform the method as described in claim 1.

10. A method of transmitting data from a block-code-encoded communication system to a different communication system comprising:
mapping a protocol including data and a number of control codes to efficient encoding blocks for transmission on various WAN systems; and
grouping overhead data from multiple of said blocks into a leading or trailing data unit in order to achieve alignment between said block-code-encoded communication system and said different communication system.

11. The method of claim 10 further comprising:
adding to said overhead data additional bits providing error detection and/or correction.

12. A method of transmitting data from an 8b/10b communication system to a different communication system comprising:
receiving a stream of 8b/10b data from said 8b/10b communication system, said 8b/10b data including both data and control codes, said control codes selected from a limited set of allowed control codes;
decoding the 8b/10b data into 8 bit data codes and N bit control codes, where N<8;
constructing a plurality of blocks, wherein each block contains M aligned portions;
wherein each said aligned portion indicates a data byte from said 8b/10b communication system or a control code formatted aligned portion; and
transmitting a block over said different communication system.

13. The method according to claim 12 further wherein:
a control code formatted aligned portion indicating a control code includes data indicating a value of the control code and data indicating a position of the control code in a received stream of 8b/10b data.

14. The method according to claim 12 further wherein:
a control code formatted aligned portion further includes data indicating whether there are additional control codes in a block.

15. The method according to claim 12 further comprising:
removing at least one overhead data bit of a block to be transmitted outside of said block.

16. The method according to claim 12 further comprising:
grouping a plurality of said blocks into one or more superblocks, each superblock containing S blocks, where S>1;
adding to a superblock one or more portions of additional aligned data indicating contents of said superblocks, wherein said additional data includes overhead data bits removed from one or more of said S blocks; and
transmitting a superblock over said different communication system.

17. The method according to claim 16 further wherein:
S=7; and
wherein said one or more bytes of additional aligned data includes error correction and/or detection values.

18. The method according to claim 16 further wherein S=8, and wherein said superblock comprises:
64 bytes corresponding to data in said received data and control code formatted aligned portion, said 64 bytes grouped into eight blocks of eight bytes each; and
one byte comprising eight bits, each bit indicating a status bit from said blocks, said status bit indicating whether a corresponding block contains at least one control code formatted aligned portion.

19. The method according to claim 16 further comprising:
selecting a size of superblock groupings such that there are bits remaining in the trailing/leading byte(s) that can be used for error detection and/or error correction.

20. The method according to claim 19 wherein said selecting is selected from the group consisting of:
to achieve single error detection, group four 64b/65b code-words with the last byte consisting of the four leading bits and a CRC-4 check over the bits in the superblock;
to achieve double error detection, group seven 64b/65b code-words with the first trailing byte containing the seven leading code bits and with the remaining bit in the first trailing byte and a second trailing byte containing bits for a CRC-9 check over said superblock;
to achieve triple error detection or single error correction, group eight 64b/65b code-words with the first trailing byte containing the eight leading code bits and with a second and a third trailing byte containing bits for a CRC-16 check over the group;
to achieve single error correction, group seven 64b/65b code-words with the first trailing byte containing the seven leading code bits; with the remaining bit in the first trailing byte and a second trailing byte containing the bits for a 9-bit shortened BCH-1 code;
to achieve single error correction, group eight code-words with their leading bits comprising the first trailing byte and the second and third trailing bytes comprise a shortened Reed-Solomon code over the group; and
to achieve double error correction, group twelve code-words with their leading bits comprising the first trailing byte and half of the second trailing byte and the remainder of the second trailing byte and the third and fourth trailing bytes contain a shortened BCH-2 code over the group.

21. The method according to claim 12 further wherein a block comprises:
a control code formatted aligned portion indicating a pad character, inserted to complete said block when there is insufficient received data.

22. The method according to claim 12 further wherein a block comprises:
a control code formatted aligned portion indicating a first character of an ordered set of values, said ordered set used for such things as to indicate loss of client signal or unrecognized received characters.

23. A communication system comprising:
an interface for receiving block code encoded data from a first communication network;
a mapper between said interface and the input of a wide area network;
said mapper able to read and decode 8b/10b data and map that data into multi-byte blocks and further map said blocks to multi-block superblocks;
a wide area network for transporting said superblocks; and
a demapper at second point of said wide area network for demapping said superblocks.

24. The system according to claim 23 further comprising:

an ingress buffer at said mapper, said ingress buffer needed to buffer just a portion of data needed to complete a superblock;

a padding controller, able to determine when sufficient data is not present at said ingress buffer and able to add padding control code characters to said data; and an egress buffer at said demapper, said egress buffer able to hold an entire superblock.

25. A system for transmitting data from a block-code-encoded communication system to a different communication system comprising:

means for receiving a stream of block-code-encoded data;

means for decoding said stream into data codes and control codes;

means for constructing a code-word, wherein each code-word contains M aligned portions;

wherein each said aligned portion can indicate a control code or a data code from said stream;

means for removing overhead data that would violate alignment of said M aligned portions to be transmitted outside of said code-words;

means for arranging one or more control codes if present within said code-word such that said control codes are aligned and unit-contained in said code-word; and means for transmitting said code-word and said overhead data over said different communication system.

* * * * *